July 15, 1941.	N. M. STEFANO	2,249,402
STABILIZING DEVICE
Filed Jan. 13, 1939	2 Sheets-Sheet 1
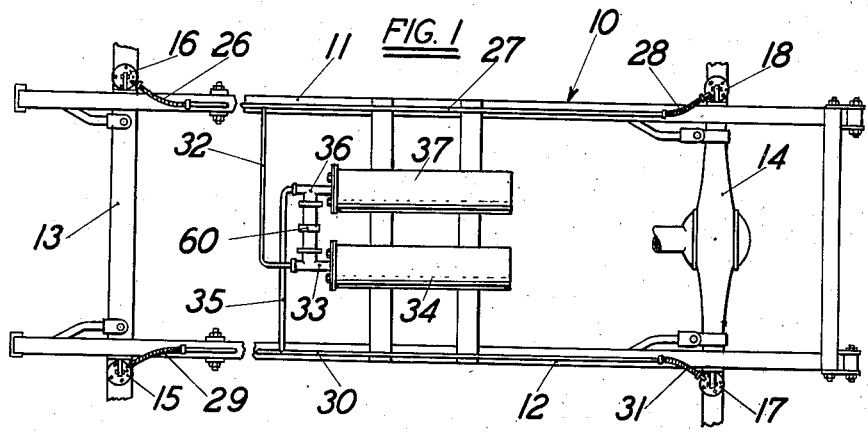
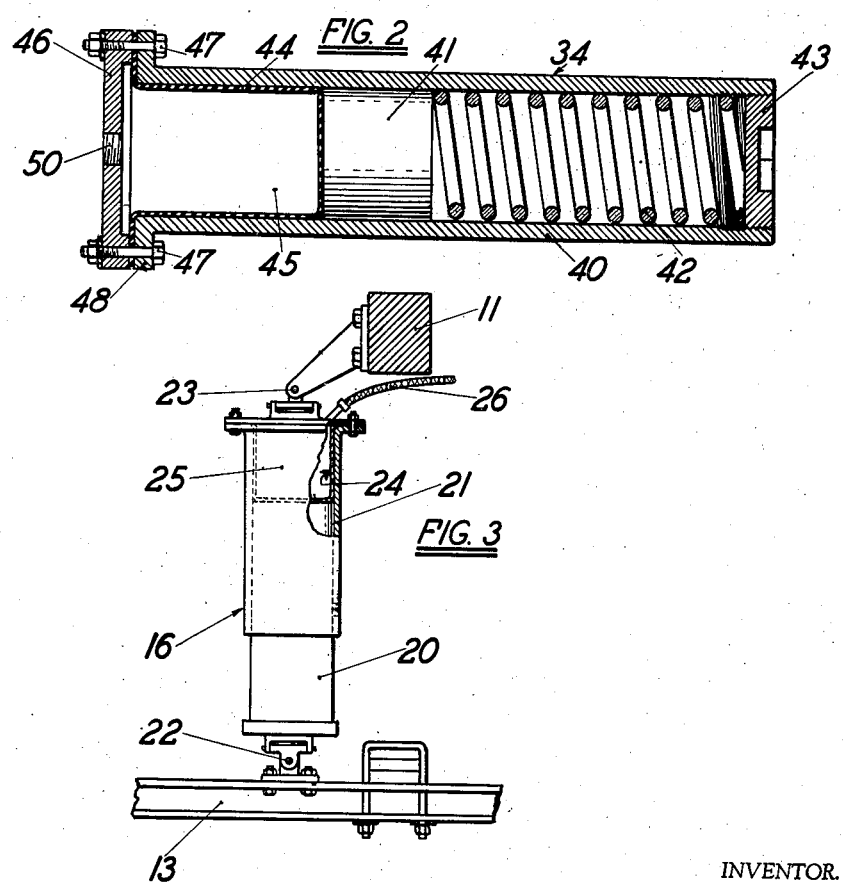
INVENTOR.
NICHOLAS M. STEFANO
BY
Philip S. Hopkins
ATTORNEY.

July 15, 1941.       N. M. STEFANO       2,249,402
STABILIZING DEVICE
Filed Jan. 13, 1939       2 Sheets-Sheet 2
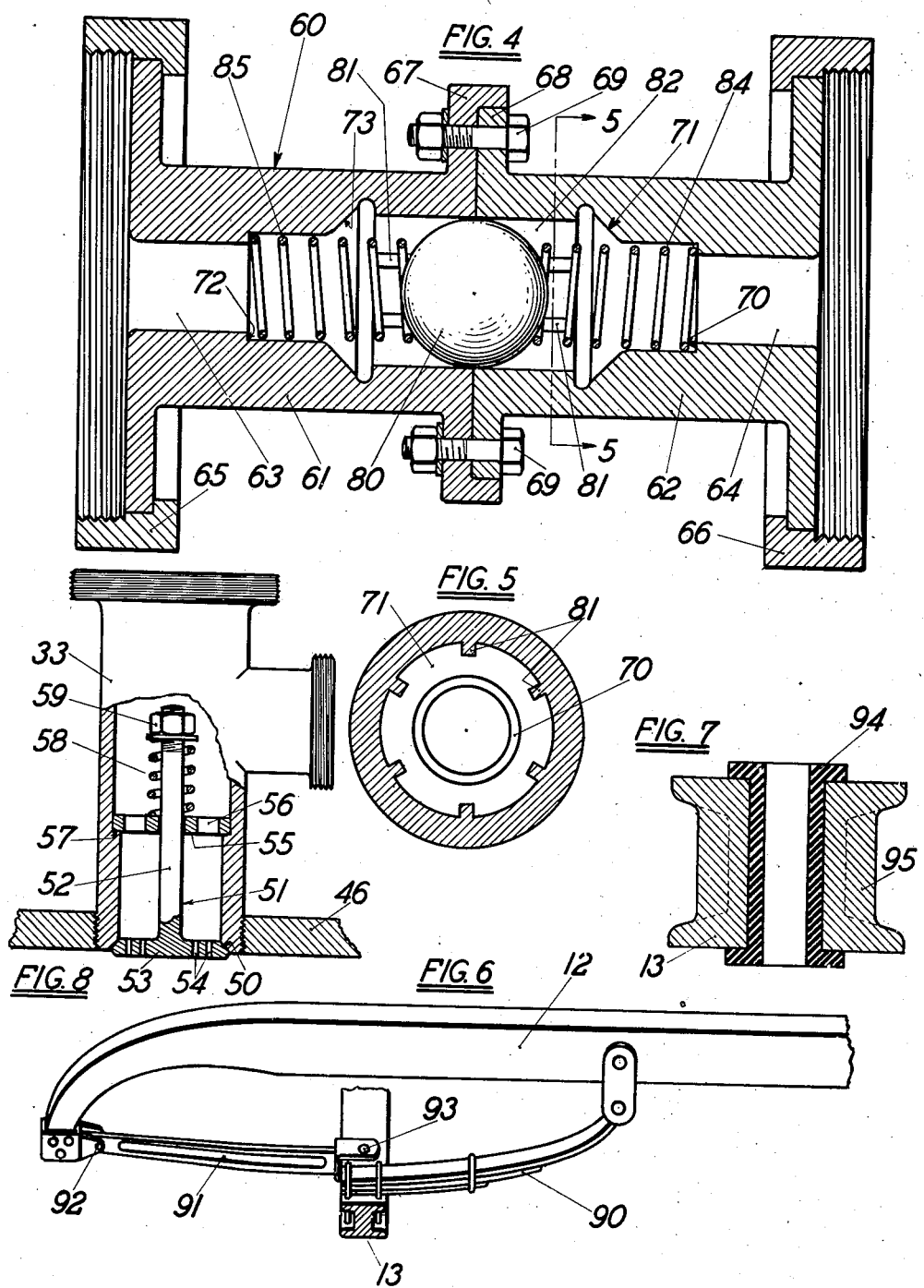
INVENTOR.
NICHOLAS M. STEFANO
BY Philip S. Hopkins
ATTORNEY.

Patented July 15, 1941

2,249,402

UNITED STATES PATENT OFFICE 2,249,402

STABILIZING DEVICE

Nicholas M. Stefano, Endicott, N. Y.

Application January 13, 1939, Serial No. 250,681

2 Claims. (Cl. 280—104)

This invention relates to a stabilizing device for motor vehicles.

A primary object of this invention is the provision of means and apparatus whereby pitching of motor vehicles as occasioned when one wheel of such a vehicle strikes an obstruction may be obviated.

A further object is the provision of means whereby upon the striking of an obstruction by one wheel of a vehicle the shock is transmitted equally to the other wheels of the vehicle whereby a relatively gentle rise of the entire vehicle is effected rather than an abrupt rise of that portion directly adjacent the wheel striking such an obstruction, as a rut or a bump or other irregularity in the road surface.

A still further object resides in the provision of improved means whereby a fluid shock absorbing system may be equalized at all times to maintain the vehicle on a level plane.

A still further object is the provision of means in such a system whereby normal sideway of the car as effected by centrifugal force as when turning a corner will not affect the stabilizing system.

Other objects will in part be obvious and in part be pointed out hereinafter.

The invention accordingly consists in the combinations of elements, arrangements of parts and features of construction all as will be more fully pointed out hereinafter and disclosed in the accompanying drawings wherein:

Figure 1 is a fragmentary plan view of a motor vehicle frame,

Figure 2 is an enlarged view showing certain details of construction,

Figure 3 is an enlarged view showing additional constructional details,

Figure 4 is an enlarged view showing additional constructional details,

Figure 5 is a sectional view taken along the line 5—5 of Figure 4 as viewed from the left, and Figure 6 is a fragmentary detail perspective view showing still further constructional details, Figure 7 is an enlarged detail sectional view showing the method of securing portions of the frame to the axle of the vehicle, and Figure 8 is an enlarged sectional view of additional constructional details.

Similar reference characters refer to similar parts throughout the several views of the drawings.

Having reference now to Figure 1 there is generally indicated at 10 the frame member of a vehicle comprised of side members 11 and 12, a front axle 13 and a rear axle 14. Secured to front axle 13, in a manner to be described hereinafter, are a pair of hydraulic units 15 and 16 and similarly secured to rear axle 14 are a pair of additional hydraulic units 17 and 18. These units are to all intents and purposes identical. For the sake of illustration an enlarged view of hydraulic unit 16 is shown in Figure 3. Each of hydraulic units 15, 16, 17 and 18 are comprised of a piston like member 20 closely engaged by a sleeve 21. Member 20 is secured to axle 13, as by means of a universal joint 22, and member 21 is secured likewise, as by means of a universal joint 23, to frame member 11. In the upper part of member 21 is a resilient gasket 24 forming a chamber 25 in which is contained a relatively non-compressible fluid comprising a part of a fluid filled system. A flexible conduit 26 leads from chamber 25 to a pipe connection 27 which communicates with a flexible conduit 28 leading to hydraulic unit 18. Similarly a flexible connection 29 leads to a conduit 30 which in turn leads to a flexible connection 31 leading to hydraulic unit 17. A pipe line 32 leads from pipe line 27 to a fitting 33, to be more fully described hereinafter, and thence to a cylinder 34 which may be positioned on the opposite side of the center of the vehicle from hydraulic units 16 and 18. Similarly a pipe line 35 leads to a fitting 36 thence to shock absorbing unit 37 substantially identical to unit 34.

Referring now to Figure 2 there is shown an enlarged view of shock absorbing member 34, which as above pointed out, is substantially identical to unit 37. Unit 34 is comprised of a sleeve like member 40 fitted with a slidable plug 41 and a heavy compression spring 42 of sufficient tensile strength to absorb substantially any shock rendered to one or more wheels of the vehicle. Spring 42 is held in abutting relation with plug 41 by a sealing plug 43 engaging a threaded portion of sleeve 40. The opposite side of plug 41 engages a resilient member 44 of a shape to form a chamber 45. Member 44 is held in place by a cap 46 secured as by nuts and bolts 47 to a flange 48 which is preferably formed integrally with sleeve member 40. Cap 46 is provided with an aperture 50 to which is connected, in any desired manner, one end of fitting 33. Fitting 33 is substantially identical to fitting 36 and for purposes of illustration is shown in Figure 8 partly in section. Within fitting 33 is a valve member, generally indicated at 51, comprised of a valve stem 52 and a valve 53. Valve 53 is provided with a plurality of relatively small apertures 54. Valve stem 52 passes through a centrally disposed aperture in a spider 55 provided with relatively large apertures 56 which seats against a flange 57 formed in the interior of member 33. A spring 58 is held in place by a nut and washer 59 and by its abutment with spider 55 biases valve 53 toward valve seat 50, holding the same normally in closed position.

A connecting member 60 is disposed between fittings 33 and 36 and this connecting member is best shown in Figures 4 and 5. Connecting member 60 consists of two oppositely disposed members 61 and 62 provided with passages 63 and 64 and fittings 65 and 66 permitting the same to be secured to extending threaded portions of members 33 and 36. Members 61 and 62 are also provided respectively with coacting flanges 67 and 68 which are secured together as by nuts and bolts 69. Within passageway 64 is a flange 70 and a second tapered flange 71, the purpose of which will be described hereinafter, and similarly within member 61 are two flanges 72 and 73. Flanges 73 and 71 are beveled to provide seats for a spherical member 80 which acts as a valve, riding on splines 81 (see Figure 5) within a chamber 82, formed by enlargement of passageways 63 and 64, and in which chamber lie coil springs 84 and 85 seated respectively against flanges 70 and 72, their opposite ends abutting sphere 80.

Thus it will be seen that sphere 80 is normally centrally positioned within member 60 but that under certain conditions, to be hereinafter described, the same may be biased against the pressure of either spring to seat against flanges 71 or 73 and close the passage between fittings 33 and 36. Fluid in the system may normally pass through the grooves between splines 81 about sphere 80.

A preferred method of correlating the spring assembly of the vehicle with the hydraulic units is shown in Figures 6 and 7 wherein frame member 12 is shown as having attached thereto a half spring 90 of conventional design secured to front axle 13. A relatively rigid member 91 is pivotally secured as at 92 to the front end of the frame and secured to axle 13 as by a pivot 93 which passes through a rubber or other resilient bushing 94 (see Figure 7) positioned in an aperture in an enlarged portion 95 of axle 13.

The entire system comprised of hydraulic units 15, 16, 17 and 18, flexible conduits 26, 27, 28, 29 and 31, connections 27, 30, 32, and 35, fittings 33 and 36, cylinders 34 and 37 and connecting member 60 is filled with a relatively noncompressible fluid.

Now from the foregoing the operation of the device should be readily understood. Upon any impact imparted to a wheel adjacent a unit the fluid in the associated chamber, as for example 24, is immediately passed to the associated hydraulic unit on the same side of the vehicle. Similarly and simultaneously the shock is transmitted through fluid pressure to the fitting 33, or 36 and thence through the valve in the fitting 51 into the chamber, as for example 45, within the associated cylinders 34 or 37 whereupon the shock is absorbed to a large extent by spring 42 or its eqivalent in cylinder 37. Similarly under normal conditions the shock is transmitted through communicating member 60 to the opposite cylinder and thence to the hydraulic units on the opposite side of the vehicle.

Thus any shock imparted to one wheel or one side of the vehicle is uniformly distributed throughout the vehicle resulting in a relatively gentle movement upon the entire vehicle rather than a relatively great impact on one portion thereof. After the fluid has passed into shock absorbing members 34 and/or 37 it is immediately forced therefrom by the expansion of spring 42 and passes through apertures 54 in valve 53. Since these apertures are relatively fine a turbulence of the fluid is set up within members 33 and 36 which turbulence tends to slow the oscillation thereof and hence dampen the shock and cut down the successive oscillations of the system.

It is necessary to compensate for inequalities of the system as occasioned by the centrifugal action of the vehicle, as upon rounding a corner or due to a relatively high road crown. This is effected by means of the valve comprised of sphere 80 in connecting member 60. When any sideways tilt is imparted to the vehicle the weight of sphere 80, aided in some instances by centrifugal force is sufficient to compress either spring 84 or 85 causing the sphere to fit against the valve seat 71 or 73 thus allowing the fluid to flow only in that direction which would tend to level or right the frame. When the system has righted itself sphere 80 returns to its central position and communication may be re-established between the two sides of the system.

The relatively light half spring 90 shown in Figure 6, in conjunction with pivoted member 91 is provided in order that there may be some bias to return the frame to a normal position without the aid of the hydraulic system, and so constructed that the hydraulic units may absorb substantially all of the shock imparted to any single wheel and transmit the same equally throughout the system rather than having a major portion of the shock absorbed by the conventional spring assembly with consequent pitching. Resilient bushing 94 is provided in order that rigid member 91 may have sufficient play to allow independent movement of one end of an axle relative to the other.

Now from the foregoing it will be seen that there is herein provided a system of maintaining equal distribution of shock imparted to any wheel or plurality of wheels of a vehicle in such manner that the entire vehicle responds to such shock as a unit without pitching.

While the apparatus is herein described as being provided with a pair of cylinders it is to be understood that this inventive concept also contemplates the use of a single cylinder or a quantity in excess of two if desired.

Now from the foregoing it will be seen that there is herein provided a device accomplishing all the objects of this invention and others including many advantages of great practical utility.

Since many embodiments may be made of the inventive concept and since many modifications may be made of the embodiments hereinbefore set forth and shown in the accompanying drawings, it is to be understood that all matter hereinbefore set forth and shown is to be interpreted merely as illustrative and not in a limiting sense.

I claim:

1. In a vehicular stabilizing system, in combination, a plurality of hydraulic units, one adjacent each wheel of said vehicle, a pair of shock absorbing means, a fluid connection between said pair of shock absorbing means, a valve disposed in said fluid connection and movable in response to centrifugal force to close said connection, direct fluid connections between those of said units on the same side of said vehicle additional connections between one of said first-mentioned connections and one of said shock-absorbing means, and between another of said first-mentioned connections and the other of said shock-absorbing means, and fluid means contained in said units, said absorbing means, and said connections.

2. In a stabilizing system for vehicles having at least two wheels on either side thereof, a plurality of hydraulic units, one adjacent each of two wheels on each side of said vehicle, a shock absorber having fluid connections with each of said hydraulic units, and a valve in the hydraulic system and normally positioned to afford unrestricted fluid communication between said hydraulic units and said shock absorber but automatically movable to close fluid communication from one side of said vehicle to the other in response to movements of the vehicle, to prevent severe sidesway of said vehicle in rounding a turn or upon being subjected to a tilting force.

NICHOLAS M. STEFANO.